United States Patent [19]
Wallace

[11] 3,712,025
[45] Jan. 23, 1973

[54] CONTINUOUS ELECTROMIGRATION PROCESS FOR REMOVAL OF GASEOUS CONTAMINANTS FROM THE ATMOSPHERE AND APPARATUS

[76] Inventor: Richard A. Wallace, 9707 Fourth Ave., Brooklyn, N.Y. 11209

[22] Filed: March 30, 1970

[21] Appl. No.: 23,733

[52] U.S. Cl. ............................55/2, 23/1 GP, 23/2 R, 55/68, 55/73, 55/101, 55/387, 204/87, 204/180 B, 204/180 P, 210/24, 210/37
[51] Int. Cl. .................................................B03c 9/02
[58] Field of Search ....204/87, 180, 180 B, 301, 103, 204/86, 129, 299 R, 98, 296; 210/24, 37; 131/10, 262 A; 55/68, 73, 74, 75, 2, 159, 179, 220, 233, 387, 388, 389, 512, 234, 101; 23/1 R, 1 GP, 2 R, 2 S, 4, 64, 36

[56] References Cited

UNITED STATES PATENTS

| | | | |
|---|---|---|---|
| 1,519,428 | 12/1924 | Wilisch | 55/234 |
| 2,259,169 | 10/1941 | Little | 210/37 X |
| 2,428,329 | 9/1947 | Ham et al. | 210/37 X |
| 2,713,077 | 7/1955 | Rieve | 210/37 X |
| 2,739,598 | 3/1956 | Eirich | 131/10 |
| 2,903,406 | 9/1959 | Miller | 204/296 |
| 3,141,729 | 7/1964 | Clarke et al. | 55/68 X |
| 3,266,973 | 8/1966 | Crowley | 210/24 X |
| 3,274,095 | 9/1966 | Meyers | 204/301 |
| 3,337,444 | 8/1967 | Meyers | 204/180 P X |
| 3,401,100 | 9/1968 | Macklin | 204/103 |
| 3,494,842 | 2/1970 | DeRespiris | 204/103 |
| 3,562,139 | 2/1971 | Leitz | 204/299 R X |

FOREIGN PATENTS OR APPLICATIONS

| | | | |
|---|---|---|---|
| 646,076 | 8/1962 | Canada | 204/180 B |
| 688,538 | 5/1930 | France | 55/234 |
| 85,041 | 1/1896 | Germany | 204/98 |
| 106,727 | 2/1939 | Australia | 210/37 |
| 708,715 | 5/1954 | Great Britain | 55/234 |
| 864,431 | 4/1961 | Great Britain | 204/301 |

OTHER PUBLICATIONS

Frilette, Vincent J., "Preparation and Characterization OF Bipolar Ion–Exchange Membranes," Journal of Physical Chemistry, Vol. 60, April 1956, pages 435–439

Primary Examiner—Dennis E. Talbert, Jr.
Attorney—Charles J. Speciale

[57] ABSTRACT

A continuous process for removal of gaseous contaminants, particularly carbon dioxide, from an atmosphere containing the same, which comprises subjecting the gaseous contaminant laden atmosphere to contact with a strongly basic ionic polymer sheet under the influence of an applied electrical field. The apparatus for accomplishing this comprises at least one and preferably a plurality of sheets of strongly basic ionic polymeric material partially suspended at the lower end thereof into a circulating stream of sea water, the polymeric sheets being interspersed between a source of an appliable electric field, e.g. a cathode and an anode, and a cation-exchange membrane and an anion-exchange membrane being in turn interspersed between the cathode and the upper exposed ends of the polymeric sheets.

19 Claims, 5 Drawing Figures

PATENTED JAN 23 1973
3,712,025
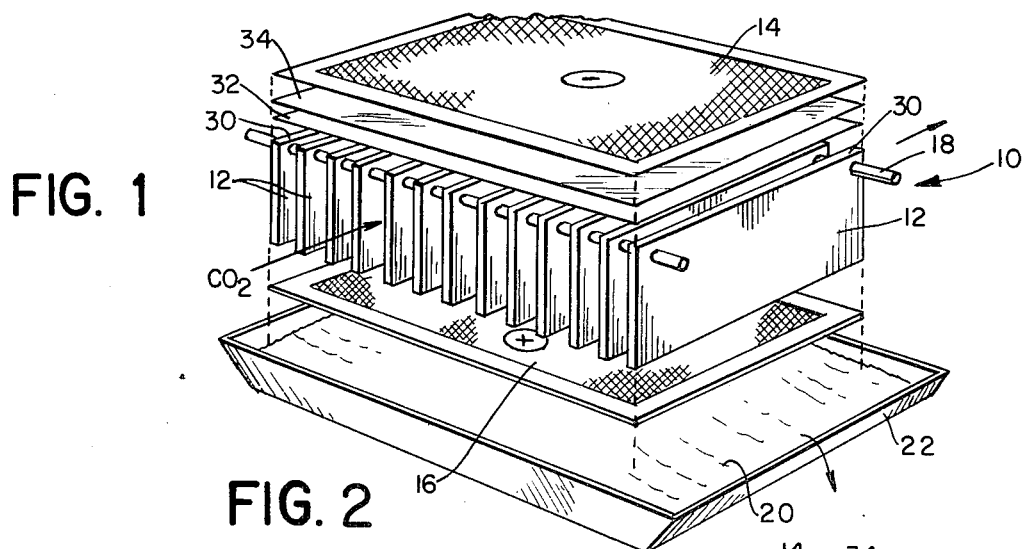
FIG. 1
FIG. 2
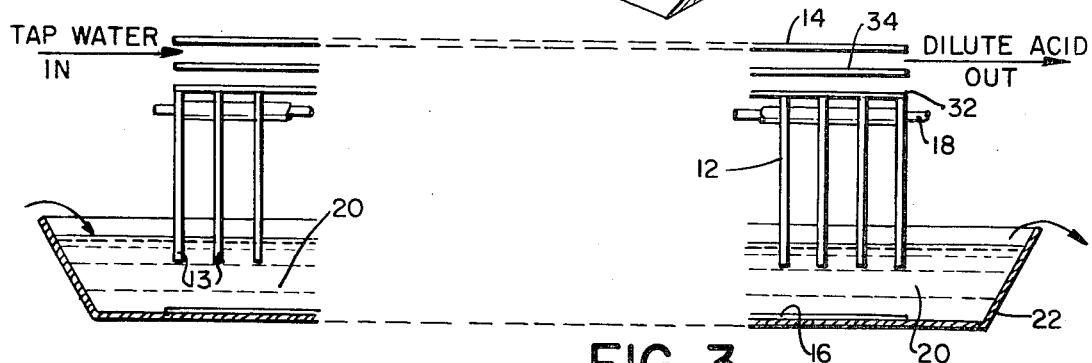
FIG. 3
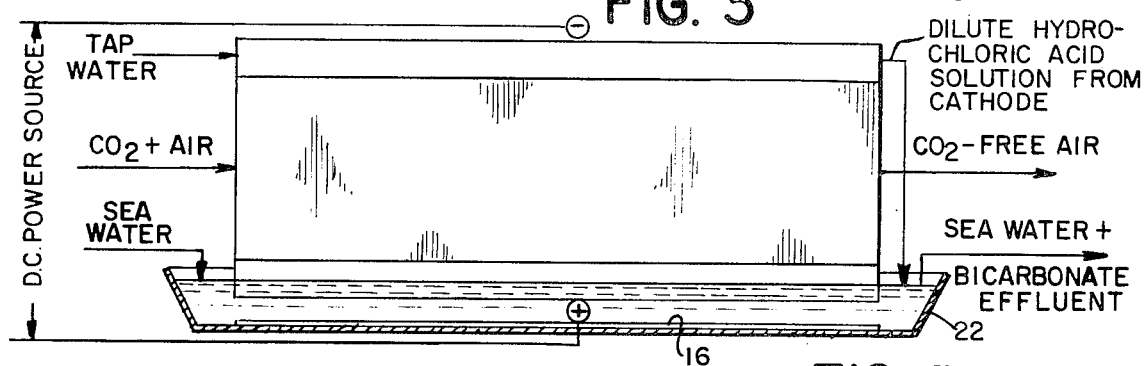
FIG. 4
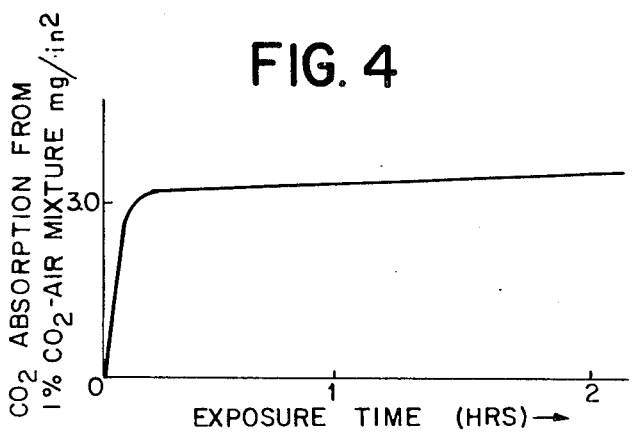
FIG. 5
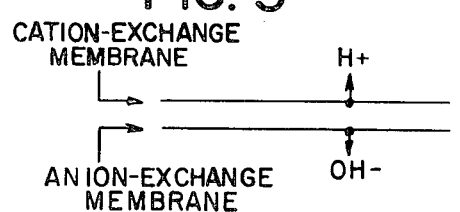
INVENTOR.
RICHARD A. WALLACE
BY Charles J. Speciale
ATTORNEY

CONTINUOUS ELECTROMIGRATION PROCESS FOR REMOVAL OF GASEOUS CONTAMINANTS FROM THE ATMOSPHERE AND APPARATUS

BACKGROUND OF THE INVENTION

1. Field of the Invention

This invention relates to an electrolytic method for removing gaseous contaminants, particularly carbon dioxide, from an atmosphere laden with the same.

2. Description of the Prior Art

Excess carbon dioxide ($CO_2$) in the atmosphere continues to pose a major habitability problem, particularly for example, for submarine personnel. The toxicity of $CO_2$ is such that visible changes in respiration and circulation occur at concentrations above 3 percent, while depression and loss of consciousness can be expected in a 5 percent $CO_2$ atmosphere. The new preferred level for submarine $CO_2$ concentration is 0.5 percent for standard operation.

The $CO_2$ scrubbers presently in use employ a modified monoethanol amine (MEA) solution as the $CO_2$ absorbent. In these systems, air is drawn into and mechanically mixed with the absorbent in the stripper boiler. After cooling, the air has an exit $CO_2$ concentration of about 0.5 percent. Although scrubber systems vary, they are generally designed to achieve a high degree of contact between the air and the recirculating MEA. Desorbed gas is passed out the top of the stripper boiler where it is cooled and ejected via the $CO_2$ compressor.

Some of the problems in scrubber operation and maintenance are listed below:

a. contamination of the atmosphere by ammonia, a degradation product of MEA.

b. excessive make-up consumption of MEA.

c. noise, overheating and possible failure of compressors under conditions of low-level $CO_2$ concentrations.

d. frequent mechanical repairs and troublesome maintenance.

e. $CO_2$ bubbles released to the ocean surface by the compressors.

f. large volume and space requirements.

SUMMARY OF THE INVENTION

In accordance with the present invention, there has now been discovered a continuous electrolytic method for removal of gaseous contaminants, particularly $CO_2$, from an atmosphere containing the same which comprises subjecting the gaseous contaminant laden atmosphere to contact with a strongly basic ionic polymer sheet under the influence of an applied electrical field.

The apparatus for accomplishing this is relatively simple and comprises, at least one, and preferably a plurality of sheets of strongly basic ionic polymeric material partially suspended at the lower end thereof into a circulating stream of sea water (or brackish water), the polymer sheets in turn being interspersed between a source of an electrical field appliable to the apparatus, e.g. a cathode and an anode, and a cation-exchange membrane and an anion-exchange membrane being in turn interspersed between the cathode and the upper exposed ends of the polymer sheets.

By this method and apparatus, the continuous removal of $CO_2$ in the form of bicarbonate anions ($HCO_3^-$) and of trace amounts (up to 50 p.p.m.) of other acidic gaseous air contaminants, such as nitrogen dioxide ($NO_2$); sulfur dioxide ($SO_2$) and hydrogen sulfide ($H_2S$), can be accomplished particularly well, for example, in submarine breathing atmospheres. By the present method impure $CO_2$ laden air, containing slight amounts of acidic gaseous air contaminants, is passed through layers of strongly basic ionic polymer sheets which hang into circulating sea water. The $CO_2$ reacts with the hydroxyl ions on the active sites of the polymer sheet forming bicarbonate ions, while the slight amounts of acidic gaseous air contaminants undergo acid-base ionic reactions. The effluent, purified air, is now recirculated back through the submarine atmosphere, while the bicarbonate ions are discharged into the sea water. As indicated, by means of an applied (direct current) voltage, the sorbed bicarbonate ions are transported towards the positively charged anode consisting of preferably a sliver-silver chloride or a copper-copper chloride anode immersed in the circulating sea water. The negatively charged cathode is similarly formed of preferably silver-silver chloride or a copper-copper chloride. On being transported to the anode electrode compartment, the bicarbonate ions are discharged into the sea water effluent in the form of a liquid sodium bicarbonate. Advantageously, since there is sodium bicarbonate originally contained in sea water, the net result is a small increase in the bicarbonate content in the sea water. The strongly basic ionic polymer sheets are regenerated into the hydroxyl ion form electrolytically, as will be more fully described hereinbelow. It is to be understood that by "strongly basic" we mean those compounds that yield hydroxyl ions in aqueous solution.

BRIEF DESCRIPTION OF THE DRAWINGS

The invention will be more fully understood with reference to the accompanying drawings in which:

FIG. 1 is a view in perspective showing the invention device situated between a source of an electrical field comprising a positive and negative electrode;

FIG. 2 is an elevated fragmented side view of the invention device shown in FIG. 1;

FIG. 3 is a flow diagram of the invention process in diagrammatic form;

FIG. 4 is a plot showing the results achieved in accordance with the method of the invention; and FIG. 5 is a diagrammatic view showing the dissociation of water at the cation-exchange and anion-exchange membrane interface.

DESCRIPTION OF THE SPECIFIC EMBODIMENTS

Referring now to the figures of the drawings, the $CO_2$ (and other acidic gaseous contaminants) removal device 10 comprises a plurality of strongly basic ionic polymer sheets 12 interspersed between a silver-silver chloride cathode 14 and a silver-silver chloride anode 16. The sheets 12 are suitably supported by means of plastic rods 18 and are suspended by their lower ends 13 into a circulating bath of sea water 20 contained in a suitable conventional trough 22. Intermediate the upper exposed ends 30 of the polymer sheets 12 and the cathode 14 is provided a sheet of anion-exchange membrane 32 and a sheet of cation-exchange membrane 34 with the anion-exchange membrane 32 being the membrane closest to the polymer sheet ends 30. A source (not shown) of tap water is provided to flow between the cation-exchange membrane 34 and the cathode 14 for a reason which will be subsequently described.

Desirably, the polymer sheets 12 number between 8 and 24 and are stacked up to a total distance of about 12 inches with about one-half inch separation between each sheet. Each polymer sheet may be about 6 inches long and about 12 inches wide. As indicated, the sheets are mechanically supported by suitable plastic rods, such as acrylic plastic. This plurality or battery of polymer sheets is allowed to dip into the circulating sea water bath 20 at the bottom of the cell. The silver-silver chloride anode 16 is fully immersed in the sea water, while the silver-silver chloride cathode 14 is immersed in the tap water at the top of the cell. As indicated, immediately below the cathode 14 is the cation and anion-exchange membrane junction which electrodialytically produces the hydroxyl regenerant ions necessary for the polymer sheets to function continuously in the removal of $CO_2$ from the $CO_2$ laden atmosphere.

Describing now in greater detail the operation of the invention method and apparatus, when a $CO_2$ laden atmosphere (see FIG. 3 flow diagram) is allowed to come in contact with the strongly basic ionic polymer sheets, these sheets absorb large volumes of $CO_2$ and moisture and convert the $CO_2$ to bicarbonate ions, which ions are then eliminated as liquid bicarbonate salts in the circulating sea water by continuous electromigration under a low direct current (D.C.) voltage. By means of the applied D.C. voltage, the sorbed bicarbonate ions are transported towards the positively charged anode which is immersed in the sea water. On being transported to the anode electrode compartment, the bicarbonate ions are discharged into the sea water effluent in the form of liquid sodium bicarbonate. The sea water effluent from the anode compartment may be pumped into, for example the submarine ballast tanks, and discharged, whenever convenient, directly into the sea. For the process to be continuous, the hydroxyl ions on the polymer sheets must of course be regenerated or replaced. This is done electrolytically and involves the electrolytic production of $OH^-$ ions and the migration of the $OH^-$ ions under the applied electrical field. This is accomplished by the dissociation of the tap water coincident with the passage of current at the interface of the anion-exchange membrane. Water molecules at the interface between the two oppositely charged ion-exchange membranes, i.e. cation and anion-exchange membranes, dissociate to provide $H^+$ and $OH^-$ ions under the influence of the applied voltage (FIG. 5). There must be pure water at the interface which is in turn of high resistivity which in turn breaks the water up into $H^+$ and $OH^-$ ions.

The strongly basic ionic polymer sheets may be any one of those commercially available containing hydroxyl groups, some of which will be described in the examples immediately below. A typical polymer sheet employable within the scope of the invention will have the following specifications.

1. $CO_2$-Absorption Capacities as equilibrated in atmosphere of 1.5% $CO_2$-Air-70% Relative Humidity at 25°C. : within the range between 10 and 85 milligrams of $CO_2$ sorbed per gram of sheet plastic.

2. Anion-current transference number : between 0.83 to unity in the direction of electromigration.

3. Electrical resistance, measured in 0.01 N NaCl solution at 25°C. : less than 10 ohm-cm$^2$.

4. water-Content : range between 30-80 percent by weight.

As illustrative of polymers falling within the specifications may be listed the following:

STRONG-BASE HYDROXYL AMINATED IONIC PLASTIC SHEETS

| Composition | Water Content [Percentage by Weight] | $CO_2$-Absorption Capacity* [Milligrams $CO_2$ Per Gram] |
|---|---|---|
| Quaternary ammonium hydroxide groups on polyethylene-styrene graft copolymer with 35% styrene and 2% divinylbenzene | 30 | 55 |
| Quaternary ammonium hydroxide crosslinked copolymer of styrene and divinylbenzene | 35 | 58 |
| Dynel-reinforced quaternary-ammonium hydroxide on vinyl-divinylbenzene copolymer | 43 | 70 |
| Fabric-reinforced Permutit Permaplex film A-20 heterogeneous aminated strong base polymer | 66 | 57 |
| A strong-base polyvinylbenzyltrimethyl ammonium hydroxide polyelectrolyte complex film | 65–70 | 73 |
| 80% strong-base reinforced quaternary ammonium hydroxide finely divided anion-exchange resins incorporated into 20% hydrophilic cellulosic binder | 75 | 80 |

*equilibrated under atmospheres of
1.5% $CO_2$-Air
70% Relative Humidity
25°C.

All of the above-listed are commercially available, except the last two, and all those skilled in the art would know how to prepare the latter.

HYDROXYL THORIUM OXIDE-PLASTIC SHEETS

The sheets used in the experiment were cast from a homogeneous solution of thorium nitrate and the polyvinylidene fluoride in dimethylacetamide solvent. After drying, the thorium nitrate is converted to the hydrous oxide form by treatment with ammonium hydroxide.

| Sheet Composition | Water Content [Percentage by Weight] | $CO_2$-Absorption Capacity* |
|---|---|---|
| 85% thorium hydrous (hydroxyl) oxide incorporated in a 15% polyvinylidene fluoride matrix binder (electrical resistance is 3 ohm-cm$^2$, measured in 0.01 N NaCl solution) | 47 | 41 milligrams $CO_2$ per gram |
| 80% mixed thorium hydrous (hyroxyl)oxide incorporated in a 20% polyvinylidene fluoride matrix binder(electrical resistance is 3.5 ohm-cm$^2$, measured in 0.01 N NaCl solution) | 41 | 37 milligrams $CO_2$ per gram |

* equilibrated under atmospheres of
1.5% $CO_2$-Air
70% Relative Humidity
25°C.

The cation-exchange and anion-exchange membranes may be any one of those commercially available, such as, for example, but not limited to Ionic's Nepton CR-61 and Ionic's Nepton AR-IIIA, respectively. Other examples of a cation-exchange and anion-exchange membrane commercially available include a heterogeneous commercial Ionac MC-3142 and Ionac MA-3148, respectively.

In most test runs, the cathode was a silver wire mesh electrolytically coated with silver chloride. During operation, the silver chloride undergoes reduction to silver metal and chloride ions* (*the discharge chloride ions remain in the vicinity of the cathode, prevented from migrating throughout the cell by the cation-exchange membrane diaphragm). Similarly, the silver-silver chloride anode undergoes oxidation, whereby silver is oxidized to silver ion, which in turn reacts with chloride ion from the surrounding sea water that flows through the anode compartment.

This system also removed trace amounts (up to 50 ppm) of the gaseous contaminants: $NO_2$, $SO_2$ and $H_2S$ from air at various humidities at room temperature. These acidic gases readily underwent ionic reactions with the reactive hydroxyl ionic groups of the strongly basic plastic sheet.

The weak acid hydrogen sulfide also underwent an acid-base reaction with the highly basic plastic sheet. All of these gaseous air contaminants were completely removed in a single pass in the present $CO_2$-removal device.

The regeneration rate of sheet polymer increased with a decrease in salt content of the water (tap water) and an increase in flow rate. All regenerations were carried out continuously at current densities up to 8 mA/cm$^2$. When the cathode electrode was used up, it was replaced with the electroformed anode. These electrodes are interchangeable.

An increase in the operative current density made the hydroxyl ion regeneration rate proceed faster, but with less efficient utilization of the current and greater power consumption.

Tap water was always circulated at a very low flow rate, between the cathode electrode and the ion-exchange membrane junction. At current densities greater than 2 mA/cm$^2$, the water at the membrane junction interface split up into $OH^-$ and $H^+$ ions. Most of the voltage drop across the electrolytic cell occurred at the bipolar membrane junction. This is expected and necessary if one wants the electrolytic breakdown of water to occur (water splitting).

FIG. 4 shows a sharp rise in the rate of $CO_2$ absorption by the anionic aminated polyethylene-graft copolymer with 35 percent styrene and 2 percent divinylbenzene sheet during the first 5 minutes of its exposure in a 1% $CO_2$-65% relative humidity atmosphere. In addition, this strong-base hydroxyl aminated sheet has a high water absorption capacity of 35 weight percent owing to the presence of hydroscopic active quaternary ammonium anionic sites incorporated in the plastic matrices.

The present electrolytic regeneration of the strongly basic polymer in sheet form is a particularly advantageous method because it eliminates costly and bulky storage equipment and chemicals and permits the use of off-peak demand of electricity which is plentiful aboard nuclear submarines. Moreover, because there are no tell-tale $CO_2$ bubbles released to the ocean surface as discharge from the submarine and because the present $CO_2$ removal system is essentially noiseless, requiring no moving parts, nuclear submarines can enjoy greater safety through enhanced silent operation and reduced visible discharge wastes. Indeed, the present method is capable of maintaining a $CO_2$ concentration in submarines of 0.5 percent or less.

While the invention has been described with particular reference to submarine atmospheres, it is also particularly suitable in any area where a $CO_2$-laden atmosphere is a problem, e.g. mines-shafts, ships' holds, etc.

This invention will be further illustrated in conjunction with the following specific experimental runs which will serve as the examples of the invention. All of the strongly basic ionic polymer sheets employed hereinbelow will be understood to meet all the required specifications as set forth earlier, whether mentioned specifically or not. In all the examples below, the ion-exchange junction was provided by a heterogeneous commercial Ionac MC-3142 cation-exchange membrane and an Ionac MA-3148 anion-exchange membrane.

RUN I

A strong-base plastic sheet consisting of quaternary ammonium hydroxide exchange groups on polyethylene-styrene graft copolymer with 35 percent styrene and 2 percent divinylbenzene was employed.

Ten sheets were used with one-half inch separation.

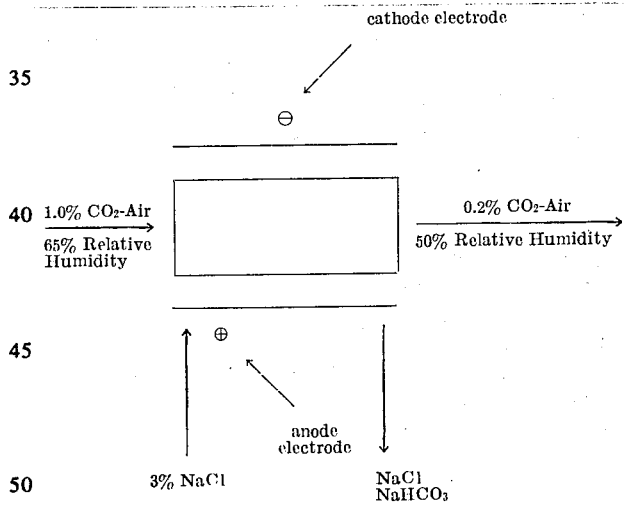

Operation Conditions:

Applied Voltage: 190 volts
Operating Current Density: 3.0 milliamps/cm$^2$
Entering Air: 1.0% $CO_2$-Air, 65% R. H. *(*relative humidity), 25°C., flow rate 15 ml/minute
Exit Air: 0.2% $CO_2$-Air, 50% R. H.
Continuous Regeneration
Average $CO_2$-Removal per gram of plastic sheet = 36 milligrams It is to be noted that exit air contained only 0.2% $CO_2$ while entering air was laden with 1.0% $CO_2$.

RUN II

A strong-base, Dynel-reinforced quaternary ammonium hydroxide on vinyl-divinylbenzene copolymer was employed as the polymer sheet.

Eight sheets were used with one-half inch separation.

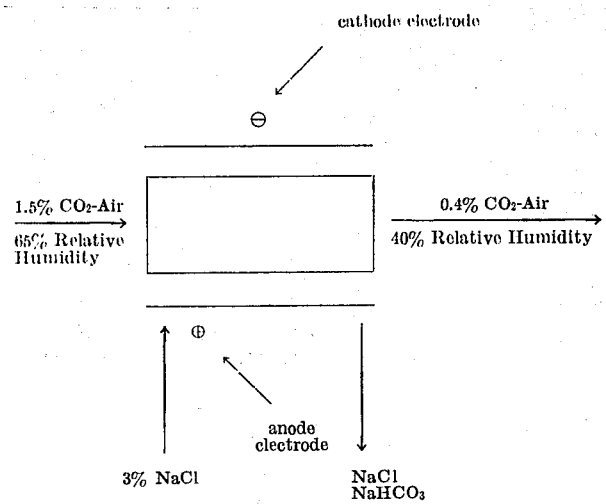

Operating Conditions:

Applied Voltage: 200 volts
Operating Current Density: 2.5 milliamps/cm$^2$
Entering Air: 1.5% $CO_2$-Air, 65% R. H., 25°C., flow rate 15 ml/minute
Exit Air: 0.4% $CO_2$-Air, 40% R. H.
Continuous Regeneration
Average $CO_2$-Removal per gram of plastic sheet = 55 milligrams Here exit air contained 0.4% $CO_2$ compared to 1.5% entering air.

RUN III

A strong-base polyvinylbenzyltrimethyl ammonium hydroxide polyelectrolyte complex was used as the polymer sheet.

Eight sheets were used with one-half inch separation.

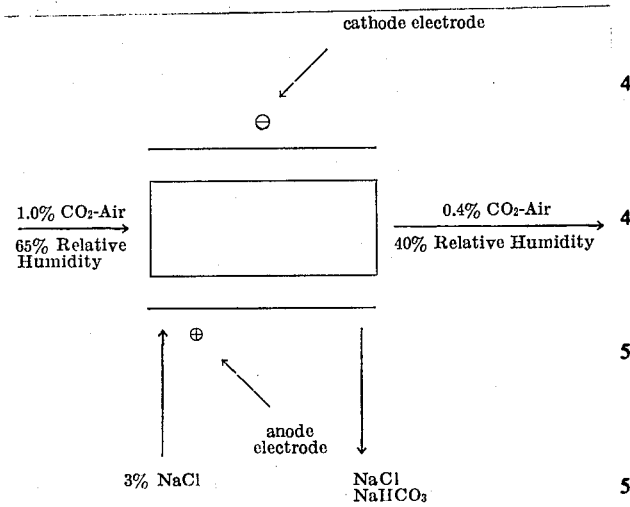

Operation Conditions:

Applied Voltage: 175 volts
Operating Current Density: 4.1 milliamps/cm$^2$
Entering Air: 1.0% $CO_2$-Air, 65% R. H., 25°C., flow rate 20 ml/minute
Continuous Regeneration
Average $CO_2$-Removal per gram of plastic sheet = 53 milligrams Again entering air was 1.0% $CO_2$ containing, while exit was only 0.4% $CO_2$ containing.

RUN IV

A fabric-reinforced heterogeneous aminated strong-base polymer (hydroxyl form) was employed as the polymer sheet.

Ten sheets were used with a one-half inch separation.

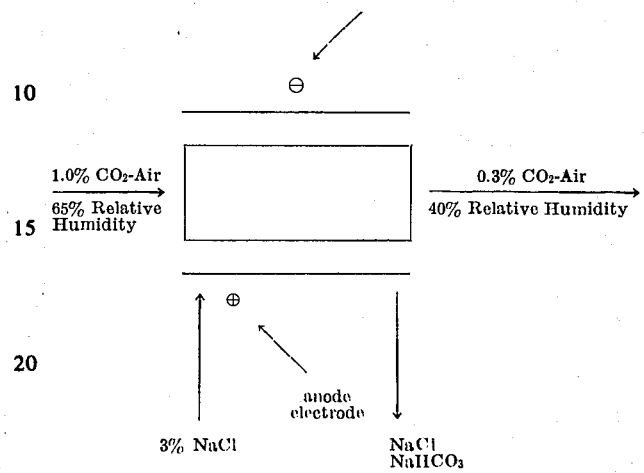

Operation Conditions:

Applied Voltage: 210 volts
Current Density: 5.0 milliamps/cm$^2$
Entering Air: 1.0% $CO_2$-Air, 65% R. H., 25°C., flow rate 15 ml/minute
Exit Air: 0.3% $CO_2$-Air, 40% R. H.
Continuous Regeneration
Average $CO_2$-Removal per gram of plastic sheet = 47 milligrams Here reduction of $CO_2$ in the treated air was over three-fold.

RUN V 80 percent strong-base reinforced quaternary ammonium hydroxide finely divided anion-exchange resins incorporated into 20 percent hydrophilic cellulosic binder was used as the polymer sheet.

Ten sheets were used with a one-half inch separation.

Operation Conditions:

Applied Voltage: 185 volts
Current Density: 6.0 milliamps/cm$^2$
Entering Air: 1.0% $CO_2$-Air, 65% R. H., 25°C., flow rate 18 ml/minute Exit Air: 0.2% $CO_2$, 40% R. H., 25°C.
Continuous Regeneration
Average $CO_2$-Removal per gram of plastic sheet = 56 milligrams
Exit air was reduced five-fold in $CO_2$ content over entering air.

What is claimed is:

1. A continuous electromigratory process for removal of acidic gaseous contaminants from an atmosphere containing the same which comprises continuously subjecting the gaseous contaminant laden atmosphere to contact with a strongly hydroxyl dry or partially hydrated ionic polymeric material under the influence of an applied electrical field whence the basic hydroxyl properties of polymeric material become depleted and continuously electrolytically regenerating, in the presence of water, the hydroxyl properties of said polymeric material.

2. A method according to claim 1 wherein said strongly basic ionic polymeric material is in elongated sheet form.

3. A method according to claim 2 wherein at least one sheet of said polymeric material is employed.

4. A method according to claim 1 wherein the gaseous contaminant comprises predominantly carbon dioxide.

5. A method according to claim 4 wherein the gaseous contaminant contains minor amounts of nitrogen dioxide, sulfur dioxide and hydrogen sulfide.

6. A method according to claim 1 wherein said polymeric material is characterized by having a carbon dioxide absorption capacity, as equilibrated in an atmosphere of 1.5 percent carbon dioxide in air, at 70 percent Relative Humidity at a temperature of 25°C., within the range of between about 10 and about 85 milligrams of $CO_2$ sorbed per gram of polymeric material; an anion-current transference number between about 0.83 and about 1 in the direction of electromigration; an electrical resistance, as measured in 0.01 N sodium chloride solution at a temperature of 25°C., of less than about 10 ohm-cm²; and a water-content range between about 30 and about 80 percent by weight.

7. A method according to claim 6 wherein said polymeric material comprises quaternary ammonium hydroxide groups on polyethylenestyrene graft copolymer with 35 percent styrene and 2 percent divinylbenzene.

8. A method according to claim 6 wherein said polymeric material comprises quaternary ammonium hydroxide crosslinked copolymer of styrene and divinylbenzene.

9. A method according to claim 6 wherein said polymeric material comprises Dynel-reinforced quaternary ammonium hydroxide on a vinyl-divinylbenzene copolymer.

10. A method according to claim 6 wherein said polymeric material comprises a fabric-reinforced Permutit Permaplex A-20 film heterogeneous quaternary ammonium hydroxide strong base polymer.

11. A method according to claim 6 wherein said polymeric material comprises a polyvinylbenzyltrimethyl ammonium hydroxide polyelectrolyte complex film.

12. A method according to claim 6 wherein said polymeric material comprises 80 percent quaternary ammonium hydroxide finely divided anion-exchange resins incorporated into a 20 percent hydrophilic cellulosic binder.

13. A method according to claim 6 wherein said polymeric material comprises 85 percent thorium hydrous (hydroxyl) oxide incorporated in a 15 percent polyvinylidene fluoride matrix binder.

14. A method according to claim 6 wherein said polymeric material comprises 80 percent mixed thorium hydrous (hydroxyl) oxide incorporated in a 20 percent polyvinylidene fluoride matrix binder.

15. An apparatus for continuously removing gaseous contaminants from an atmosphere containing the same which comprises at least one elongated sheet of strongly hydroxyl dry or partially hydrated ionic polymeric material partially suspended at its lower end thereof into a circulating stream of sea water or brackish water, said polymeric sheet being interspersed between a source of an electrical field appliable to said apparatus consisting of a cathode and an anode, a cation-exchange membrane and an anion-exchange membrane, forming an ion-exchange membrane junction, being in turn interspersed between said cathode and the upper exposed ends of said polymeric sheet, a source of water being circulable between said cathode and the ion-exchange membrane junction.

16. An apparatus according to claim 15 wherein a plurality of said polymeric sheets are provided.

17. An apparatus according to claim 15 used for removing carbon dioxide from a carbon dioxide laden atmosphere.

18. A dry electromigratory process for removal of acidic gaseous contaminants from an atmosphere containing the same which comprises subjecting the gaseous contaminant laden atmosphere to contact with a strongly basic ionic hydrated polymeric material under the influence of an applied electrical field.

19. A continuous dry electromigratory process for removal of carbon dioxide from an atmosphere containing the same which comprises continuously subjecting the carbon dioxide laden atmosphere to contact with a strongly basic (hydroxyl) ionic hydrated polymeric material capable of forming hydroxyl ions in aqueous solution, under the influence of an applied electrical field thereby converting said carbon dioxide to the bicarbonate ion form, whence the hydroxyl ions formed by said polymeric material become depleted, and continuously electrolytically regenerating the hydroxyl ions on said polymeric material and continuously recovering the bicarbonate ion.

* * * * *